(12) United States Patent
He et al.

(10) Patent No.: US 9,330,404 B2
(45) Date of Patent: May 3, 2016

(54) APPLYING SCREENING INFORMATION TO SEARCH RESULTS

(75) Inventors: Mei He, Hangzhou (CN); Yu Sheng, Hangzhou (CN); Wei Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 13/599,663

(22) Filed: Aug. 30, 2012

(65) Prior Publication Data

US 2013/0060755 A1 Mar. 7, 2013

(30) Foreign Application Priority Data

Sep. 1, 2011 (CN) .......................... 2011 1 0257216

(51) Int. Cl.
*G06F 7/00* (2006.01)
*G06F 17/30* (2006.01)
*G06Q 30/06* (2012.01)
*G06Q 30/02* (2012.01)

(52) U.S. Cl.
CPC .......... *G06Q 30/06* (2013.01); *G06F 17/30867* (2013.01); *G06Q 30/02* (2013.01)

(58) Field of Classification Search
CPC .......................... G06F 17/30386; G06Q 50/01
USPC ...................................................... 707/754
See application file for complete search history.

(56) References Cited

U.S. PATENT DOCUMENTS

| | | |
|---|---|---|
| 5,886,698 A | 3/1999 | Sciammarella et al. |
| 7,328,216 B2 | 2/2008 | Hofmann et al. |
| 7,933,900 B2 | 4/2011 | Reddy et al. |
| 8,099,683 B2 | 1/2012 | Garbow et al. |
| 8,458,157 B2 | 6/2013 | Alexander et al. |
| 2001/0054054 A1* | 12/2001 | Olson ............... G06F 17/30867 718/1 |
| 2004/0133612 A1 | 7/2004 | Satomi |
| 2004/0205046 A1* | 10/2004 | Cohen ............... G06F 17/30619 |
| 2005/0149410 A1* | 7/2005 | Livesay .................. G06Q 10/06 705/26.8 |
| 2007/0192314 A1* | 8/2007 | Heggem ............ G06F 17/30867 |
| 2008/0065501 A1* | 3/2008 | Stuart ..................... G06Q 30/00 705/26.1 |
| 2008/0294625 A1 | 11/2008 | Takeuchi |
| 2010/0185619 A1 | 7/2010 | Zhang et al. |
| 2011/0060733 A1 | 3/2011 | Peng et al. |
| 2011/0295720 A1* | 12/2011 | Parikh ................. G06F 17/3064 705/27.1 |

FOREIGN PATENT DOCUMENTS

| | | |
|---|---|---|
| JP | H10320418 | 12/1998 |
| JP | 2002123609 | 4/2002 |

(Continued)

*Primary Examiner* — Jacob F Bétit
*Assistant Examiner* — Van Oberly
(74) *Attorney, Agent, or Firm* — Van Pelt, Yi & James LLP

(57) ABSTRACT

Applying screening information to search results is disclosed, including: receiving a search request for products, wherein the search request comprises one or more search conditions and a set of user information; retrieving screening information associated with the set of user information, wherein the screening information indicates one or both of seller information and product information to exclude from search results; determining a plurality of search results based at least in part on the one or more search conditions and determining a search result from the plurality of search results to be excluded based at least in part on the screening information; and returning one or more search results from the plurality of search results other than the search result determined to be excluded.

21 Claims, 7 Drawing Sheets

(56) References Cited

FOREIGN PATENT DOCUMENTS

| | | |
|---|---|---|
| JP | 2006330981 | 12/2006 |
| JP | 2009009257 | 1/2009 |
| JP | 2009259002 | 11/2009 |
| JP | 2010204862 | 9/2010 |
| WO | 2010132212 A1 | 11/2010 |
| WO | 2011055174 A1 | 5/2011 |

* cited by examiner

APPLYING SCREENING INFORMATION TO SEARCH RESULTS

CROSS REFERENCE TO OTHER APPLICATIONS

This application claims priority to People's Republic of China Patent Application No. 201110257216.2 entitled WEBSITE INFORMATION SEARCH METHOD AND SYSTEM filed Sep. 1, 2011 which is incorporated herein by reference for all purposes.

FIELD OF THE INVENTION

The present application relates to the field of computer network data-processing technology. In particular, it relates to techniques associated with presenting search results.

BACKGROUND OF THE INVENTION

Conventionally, an electronic commerce (e-commerce) website will set up various product categories in which products may be classified. Users who are registered at the e-commerce website may advertise products they wish to sell at the website by selecting the one or more categories to which the products belong. Users who wish to buy products at the e-commerce website may search for desired products using search keywords or other search conditions. Information associated with products that are relevant to the user's input search keywords or other search conditions may be returned for the user as search results.

Typically, since there might be more than one user that sells products in a particular category of products, the e-commerce website, to ensure fairness, may assign products sold by different sellers with the same probability of being found and presented among a set of search results. As a result, so long as users use the same or similar search keywords and/or search conditions, the search results that they receive may be the same. However, since each user may have a different expectation for what to see among the search results, the same search results may not necessarily suit every searching user. For example, assume that a certain style of clothing has been very popular recently. Thus, users that search for popular clothing styles may see clothing products associated with the recently popular style among their search results. However, User A may not like this style of clothing and does not want this style of clothing to appear among the search results returned for User A. In another example, assume that User C purchased something at Seller B's online shop at the e-commerce website and discovered that it was of very poor quality and that the proprietor had ineffective customer service. As a result, User C no longer wishes to purchase anything from Seller B's online shop and consequently, User C does not wish for products supplied by Seller B to show up among the search results returned for User C. If the technique of providing search results described above is used, then the same search results would be returned for different users that input similar search keywords and/or searching conditions but not every user may be satisfied with the content of the returned search results. As a result, users may acquire desired product search results less efficiently and less effectively.

BRIEF DESCRIPTION OF THE DRAWINGS

Various embodiments of the invention are disclosed in the following detailed description and the accompanying drawings.

DETAILED DESCRIPTION

Figure 1:
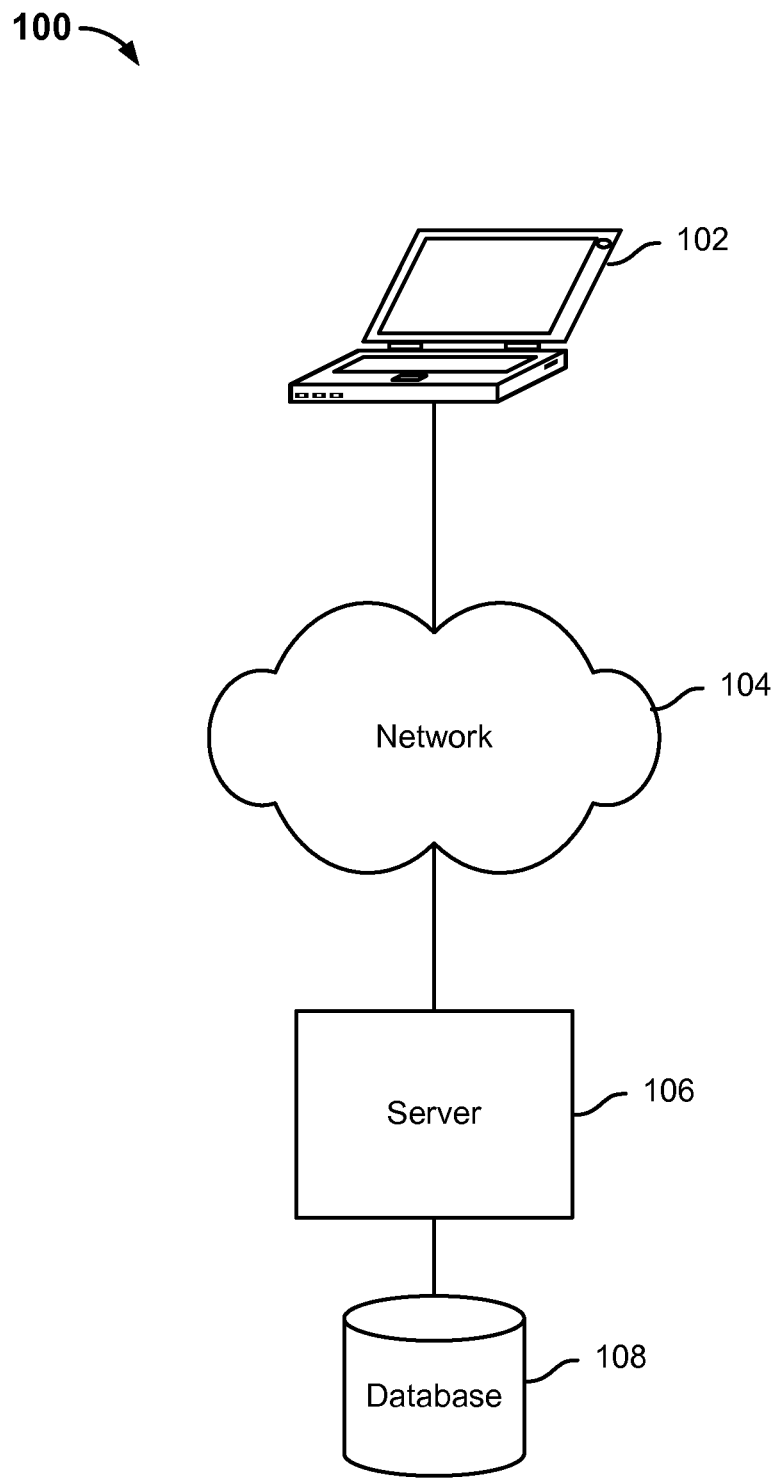
FIG. 1 is a diagram showing an embodiment of a system for applying user configured screening information to search results.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Applying user configured screening information to search results is described herein. In some embodiments, a user may configure one or more pieces of screening information with respect to information that the user desires to exclude from, screen out, and/or filter out from search results. For example, in the context of an e-commerce website, a user may indicate that he or she does not desire to receive any search results in future searches of products at the website associated with particular products or products sold by particular seller users. In some embodiments, a user may configure screening information using a user interface configured to facilitate the creation of screening information. In some embodiments, a particular user's configured screening information is stored with an association to that particular user. Then, in a subsequent search by the user, the screening information stored for that user may be retrieved and applied to the search results to be returned for the user. Returning to the example of the e-commerce website, in a subsequent search by the user for desired products, the user's stored screening information may be retrieved and applied to the determined search results. For example, applying the screening information to the determined search results may comprise excluding those one or more search results associated with particular products and/or products sold by one or more particular seller users that are indicated in the screening information. The non-excluded search results are then returned and presented to the user.

FIG. 1 is a diagram showing an embodiment of a system for applying user configured screening information to search results. In the example, system 100 includes device 102, network 104, server 106, and database 108. Network 104 includes high speed data networks and/or telecommunications networks. While database 108 is shown to be one database, it may comprise more than one database.

Device 102 is configured to communicate to server 106 over network 104. While device 102 is shown to be a laptop computer, other examples of device 102 include a desktop computer, a tablet device, a smart phone, a mobile device, or any other computing device. Server 106 is configured to either host or at least be associated with an e-commerce website. In some embodiments, server 106 is configured to provide a search engine function for the website including at least by performing searches for products based on received search requests.

A user using device 102 may access the website associated with server 106. For example, the user may access the website using a web browser application that is installed at device 102. In some embodiments, controls that are configured to cause exclusion from future search results are displayed at webpages associated with different products for sale at the website. A user who is browsing through the webpages may select the controls presented at the webpages when the user decides to exclude particular products and/or particular sellers of products from showing up among search results that will be received by the user in the future. Such screening information configured by the user may be stored with server 106 at database 108.

In some embodiments, a user using device 102 may submit a search request for desired products to the website associated with server 106. In some embodiments, the search request may include one or more search conditions (e.g., search keywords) and user information associated with the user who submitted the search request. Server 106 is configured to retrieve screening information corresponding to the user information in the search request stored at database 108. Server 106 is configured to perform a search based on the search conditions and find a set of search results. Prior to returning the search results to be displayed at an appropriate webpage for the user at device 102, server 106 is configured to compare the found search results against the retrieved screening information and those search results that match the product information or seller information that are indicated among the screening information are excluded from the set of search results that are to be returned to and displayed for the user at device 102.

Figure 2:
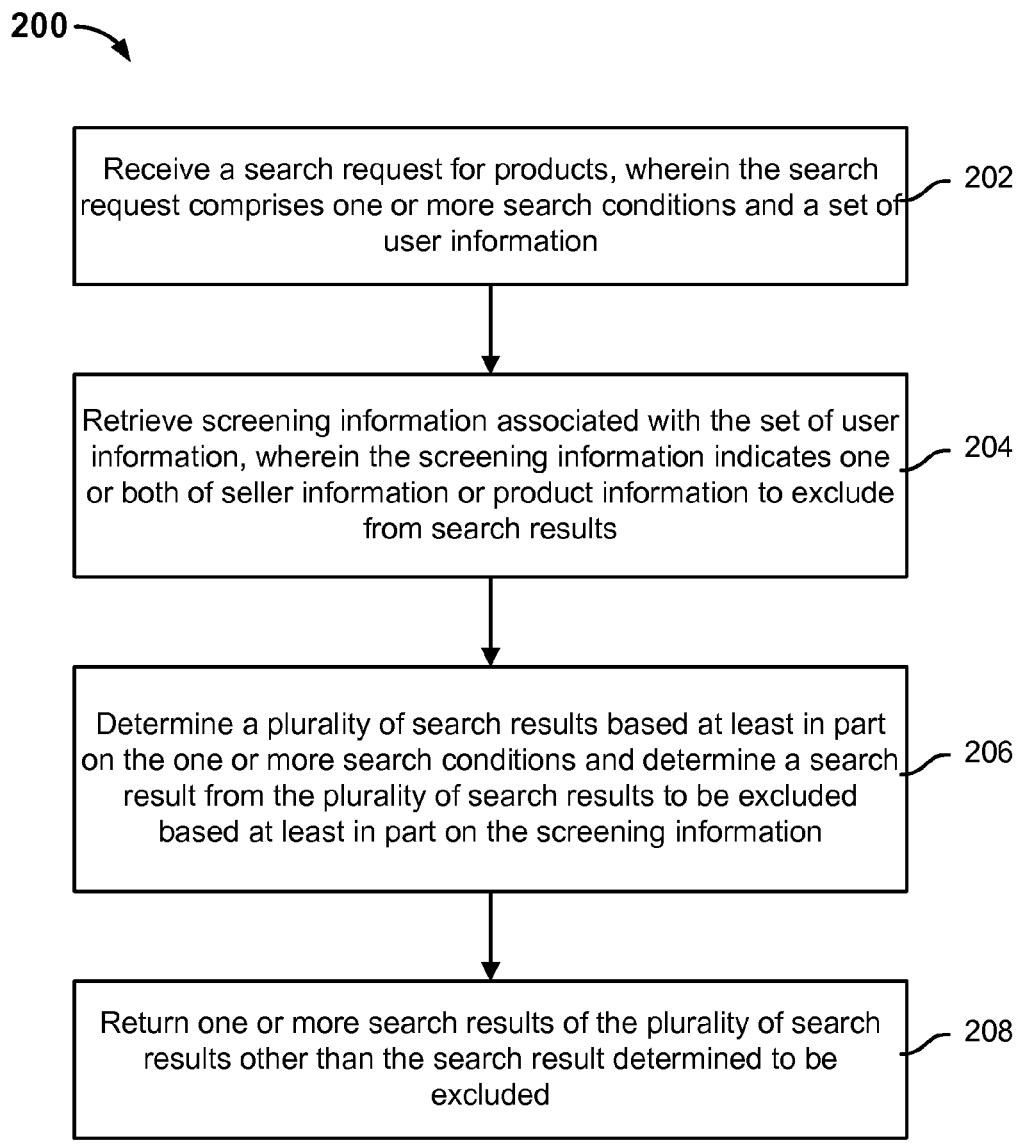
FIG. 2 is a flow diagram showing an embodiment of a process for applying user configured screening information to search results.

FIG. 2 is a flow diagram showing an embodiment of a process for applying user configured screening information to search results. In some embodiments, process 200 may be performed at system 100.

At 202, a search request for products is received, wherein the search request comprises one or more search conditions and a set of user information.

In some embodiments, a user may submit a request to search for products at a website. In some embodiments, the user who submitted the search request is sometimes referred to as the searching user. In some embodiments, the website comprises an e-commerce website at which users can sell products to other users. For example, a seller user may create a webpage that advertises one or more products that the seller user sells. The webpage may include information regarding the product(s) such as product specifications (e.g., brand, manufacturer, model, and release date), price, shipping information, one or more product categories to which the product(s) belong and so forth. In some embodiments, the search request may be submitted at an input field of a search engine associated with the e-commerce website.

The search request may include one or more search conditions such as, for example, search keywords, selections (e.g., selections of one or more specific product categories to search in or a selection to search in all product categories), and/or other qualifiers (e.g., specified price range, specified product release date range) that describe product(s) that the searching user may desire to purchase. The search request also includes user information associated with the user that submitted the request. In some embodiments, the user information may comprise a user identifier such as an alphanumeric string that is generated for a user that is associated with an account at the website. In some embodiments, the user information is used at least to associate together different pieces of screening information stored for the user at the website. In some embodiments, the user information of the searching user may be determined based at least in part on the user being currently logged onto the website when he or she performed the search.

For example, the search request may include the search keyword "office chair" because the searching user, Alice, desires to purchase a new office chair.

At 204, screening information associated with the set of user information is retrieved, wherein the screening information indicates one or both of seller information and product information to exclude from search results.

In some embodiments, screening information associated with a user may include information associated with particular products and/or particular sellers which the searching user wishes to exclude from the search results to be returned for the user. For example, the screening information may include keywords associated with products, keywords associated with product categories, user information of sellers, and unique identifiers of products. In some embodiments, the screening information associated with the searching user is configured by the searching user prior to the submission of the current search request. In some embodiments, the screening information configured by the searching user is stored with the user's user information. For example, a user may configure screening information by making selections to exclude particular products, types of products, categories of products, and/or sellers while browsing the e-commerce website, as will be further described with FIG. 3.

In some embodiments, in response to receiving the search request, the stored screening information corresponding to the user information included in the search request is retrieved and applied to search results to be found for the user. In some embodiments, the retrieved screening information may be parsed to identify the one or more products and/or sellers to be excluded (e.g., filtered out from the found search results).

Returning to the previous example, user Alice previously had a bad experience with the seller user ChairKing123 when she purchased an item from that seller (e.g., Alice never received the previous item that she ordered from the seller and had trouble acquiring a refund). So user Alice has configured her set of screening information to include seller ChairKing123 among the list of sellers that she does not wish to see among search results. Furthermore, Alice has also decided that she doesn't want an office chair that has a static height (because Alice wants an office chair of an adjustable height) so she has also configured her set of screening information to include the keywords of "static height" and "nonadjustable height" among keywords associated with products that she does not wish to see among search results.

At 206, a plurality of search results is determined based at least in part on the one or more search conditions and a search result from the plurality of search results is determined to be excluded based at least in part on the screening information.

In some embodiments, a search is performed by the website's search engine for search results relevant to the search conditions of the search request. For example, a search result may comprise a piece of information associated with a product for sale at the website or a link to the webpage created by a seller that advertises that product for sale. In various embodiments, each search result is associated with the seller that sells the particular product. Prior to returning the found search results to the searching user, the found search results are compared to the screening information retrieved for the searching user and those search results that match the screening information are excluded from the set of search results that returned to and displayed for the searching user. In some embodiments, the found search results are compared against the retrieved screening information and those search results that match the keywords, product identifiers, and/or user information of sellers, for example, indicated in the screening information may be filtered out, screened out, and/or withheld from being displayed to the searching user.

Returning to the previous example, prior to displaying the search results found based on Alice's search conditions, the set of found search results are compared against the screening information retrieved for Alice. As a result of the comparison, the search result(s), if any, that match the screening information including the seller user information of ChairKing123 and keywords of "static height" and "nonadjustable height" are removed from the set of search results to be returned to and displayed for Alice. So, after the comparison, none of the search results that are to be returned to and displayed for Alice are associated with the seller user information of ChairKing123 nor are associated with the keywords of "static height" and "nonadjustable height."

At 208, one or more search results of the plurality of search results are returned other than the search result determined to be excluded.

The set of search results that are returned to the searching user exclude search results that matched the screening information retrieved for the searching user. In other words, the excluded search results are at least not displayed for the search user at the client device used by the searching user. This way, the searching user is shown only those search results that are not associated with screening information that the user has previously configured for him or herself. As a result of applying screening information to search results to be returned for a user, the search results that the user does not wish (as indicated in the previously configured screening information) to browse will be excluded from the list of search results that the searching user sees, which could save the user time and frustration from perusing through search results in which the user has no interest.

Figure 3:
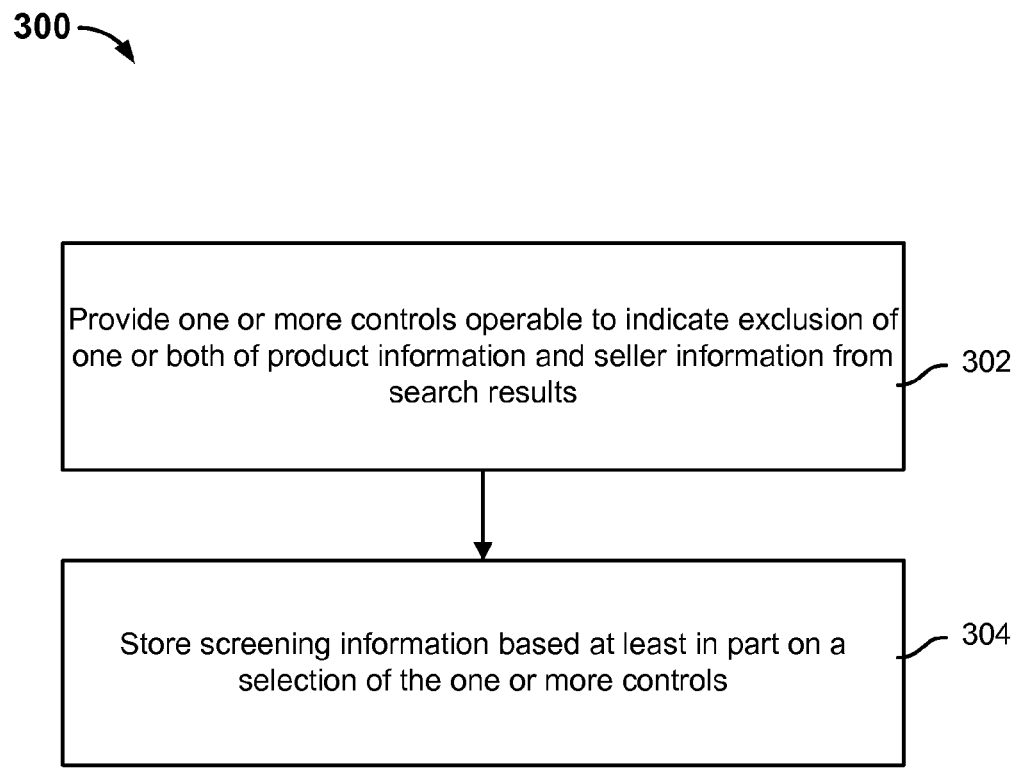
FIG. 3 is a flow diagram showing an embodiment of a process for configuring screening information for a user.

FIG. 3 is a flow diagram showing an embodiment of a process for configuring screening information for a user. In some embodiments, process 300 may be implemented at system 100. In some embodiments, process 300 may be implemented at least once prior to implementing process 200.

At 302, one or more controls operable to indicate exclusion of one or both of product information or seller information from search results are provided.

Process 300 may be implemented to enable a user to configure screening information for excluding product information and/or seller information from future search results that may be presented to the user. One advantage to enabling users to configure and store screening information is so that users may get the chance to tailor future search results to their interests.

In some embodiments, one or more controls are provided for a user at various webpages to indicate product information and/or seller information that the user wishes to exclude from subsequent search results (to be returned for future searches). For example, in the context of an e-commerce website, such controls may be presented at user interfaces that comprise webpages that advertise various products for sale by one or more sellers. For example, a control may be implemented as a button or other type of selection that a user can select using a mouse as the user browses the webpages. For example, at a webpage that advertises a particular product, a first control may be selected to indicate that the user desires to exclude the particular product featured at the webpage from search results (e.g., the first control may comprise a button with the text "Do not want to see this product again") and a second control may be selected to indicate that the user desires to exclude the seller associated with the featured product (e.g., the second control may comprise a button with the text "Do not want to see products from this seller again"). For example, while browsing various product webpages, a user may encounter product information and/or seller information that the user may not desire to see among future search results because of a user's preferences/tastes and/or previous experience(s) with certain sellers and/or products. In some embodiments, in response to selection of a control, a JavaScript code is triggered to be executed and the JavaScript code is configured to facilitate the storing of screening information associated with the user information of the user that made the selection and the product information or seller information associated with the control.

At 304, screening information is stored based at least in part on a selection of the one or more controls.

In some embodiments, the JavaScript that is triggered to be executed in response to selection of a control sends the user information of the user that made the selection and the product information or seller information associated with the control to a service that generates and stores screening information. Generating and storing the screening information includes storing a relationship between the user information and the product information and/or seller information associated with the control. For example, the user information and the product information and/or seller information associated with the control may be stored in a two-dimensional relational table to establish a one-to-one correspondence between the user information and the product information and/or seller information that the user associated with the user information wishes to exclude from future search results to be returned to the user.

In processing a subsequently received search request, the found search results will be compared against the screening information stored with the user information that is included in the search request. Then those search results that match the retrieved screening information will be excluded from the set of search results that are returned and presented for the user that submitted the search request.

Figure 4:
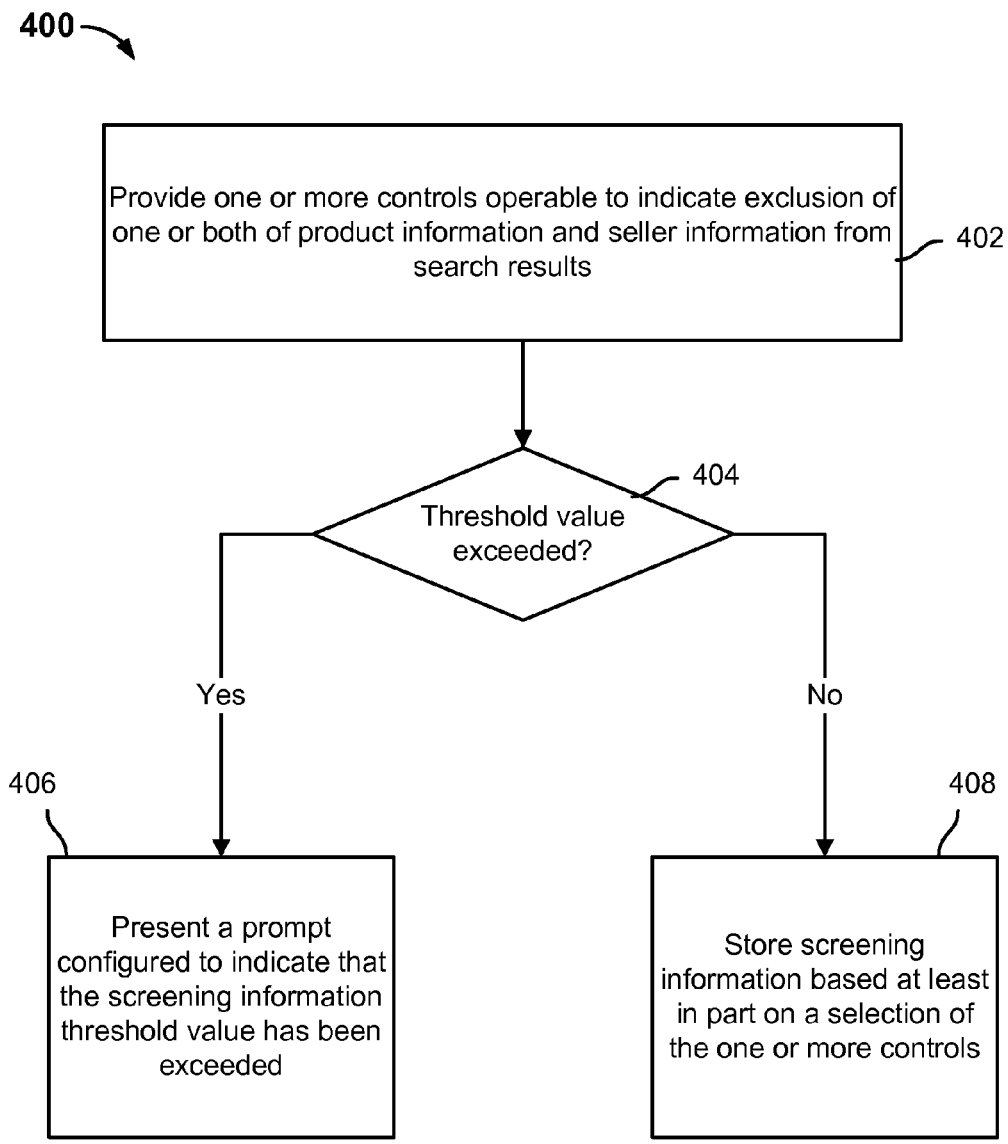
FIG. 4 is a flow diagram showing an embodiment of a process for configuring screening information for a user.

FIG. 4 is a flow diagram showing an embodiment of a process for configuring screening information for a user. In some embodiments, process 400 may be implemented at system 100. In some embodiments, process 400 may be used alternatively to process 300. Process 400 may be used for configuring screening information and in a manner that helps to limit the amount of screening information that is stored for a user.

At 402, one or more controls operable to indicate exclusion of one or both of product information and seller information from search results are provided. 402 is the same as 302 of process 300.

At 404, it is determined whether screening information stored for a set of user information exceeds a screening information threshold value. In some embodiments, a screening information threshold value may be preset to limit the number of pieces of product information and/or seller information that is excluded from future search results that may be stored corresponding to each set of user information. Such a threshold value may help to reduce the volume of screening information data that is stored for various users.

In the event that the threshold value is exceeded, the process proceeds to 406. Otherwise, the process proceeds to 408.

At 406, a prompt configured to indicate that the screening information threshold value has been exceeded is presented. In some embodiments, when the screening information threshold value is exceeded, it means that the user has exceeded the number of pieces of screening information that he or she is allotted to store and must therefore delete a piece of stored screening information before storing new screening information. After the user receives the prompt, he or she may delete previously stored pieces of screening information.

At 408, screening information is stored based at least in part on a selection of the one or more controls. 408 is the same as 304 of process 300.

In some embodiments, one or more screening information threshold values may be set (e.g., by a system administrator). For example, one screening information threshold value may be general to all product categories and various other screening information threshold values may be associated with various respective product categories. In some embodiments, multiple databases may be established; a first general database may be used for storing screening information associated with products of all product categories and other category-specific databases may be used for storing screening information associated with respective particular product categories. For example, if a user selects a control associated with excluding a particular product, then that piece of screening information between the user information and the particular product will count against the screening information threshold value that is general to all product categories. Furthermore, if the particular product to be excluded is associated with product category X, then that piece of screening information between the user information and the particular product will also count against the screening information threshold value specifically associated with product category X. When a user performs a search across all product categories, then the screening information associated with the user information of the searching user is retrieved from the first database that is general to all product categories. When the user conducts a search under a certain product category (e.g., the search of products is limited to only products of that selected category), the screening information associated with the user information of the searching user is retrieved from a category-specific database.

For example, assume that the screening information threshold value general to all product categories and each of the screening information threshold values associated with specific product categories are set at 100. When a user selects a control for excluding one piece of product information or seller information, the current count for pieces of screening information associated with any product category is determined and compared to the screening information threshold value that is general to all product categories. If the count is less than 100, then the new piece of screening information is stored in the first database that is general to all product categories. Otherwise, if the count is greater than or equal to 100, then a prompt is generated to alert the user that the screening information threshold value that is general to all product categories has been exceeded. Additionally, the product category to which the product information or the products supplied by the seller of the seller information selected to be excluded is determined and the current count for pieces of screening information associated with that particular product category is determined and compared to the screening information threshold value that is associated with that specific product category. If the count is less than 100, then the new piece of screening information will be stored in the product category-specific database, and in some embodiments, regardless if the same piece of screening information is already stored or not in the database that is general to all product categories. Otherwise, if the count is greater than or equal to 100, then a prompt is generated to alert the user that the screening information threshold value associated with the specific product category has been exceeded.

In other words, when a user selects a piece of product information or seller information to be added as a new piece of screening information, it is possible to store the screening information in either or both the general database and/or the appropriate category specific database, depending on whether each database's corresponding threshold value has been exceeded. Providing multiple databases increases the number of pieces of screening information that may be stored and the availability of such screening information.

Figure 5:
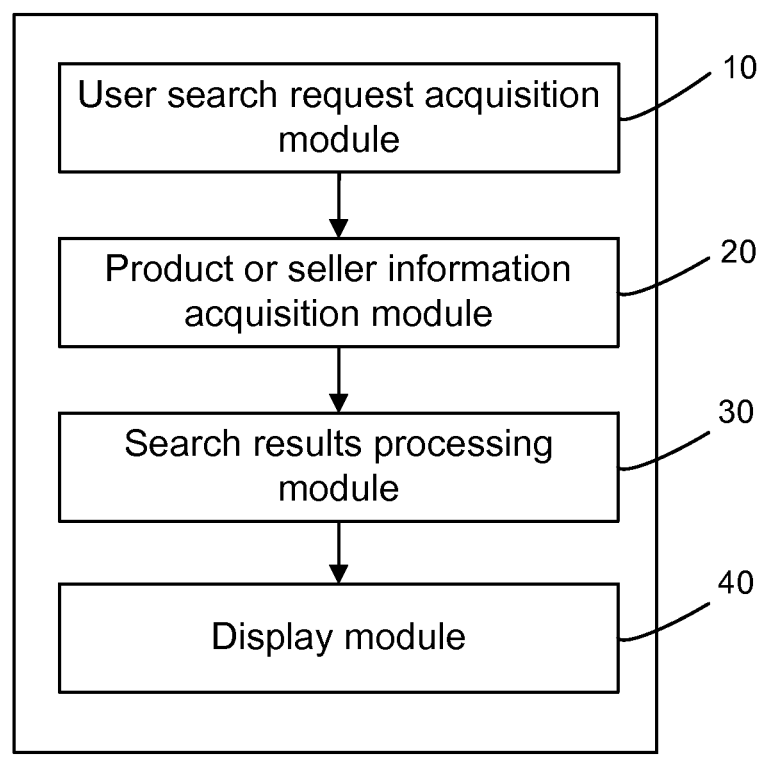
FIG. 5 is a diagram showing an embodiment of a system for applying screening conditions to search results.

FIG. 5 is a diagram showing an embodiment of a system for applying screening conditions to search results. In the example, system 500 includes user search request acquisition module 10, product or seller information acquisition module 20, search results processing module 30, and display module 40.

The modules and units can be implemented as software components executing on one or more processors, as hardware such as programmable logic devices and/or Application Specific Integrated Circuits designed to perform certain functions, or a combination thereof. In some embodiments, the modules and units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and units may be implemented on a single device or distributed across multiple devices.

User search request acquisition module 10 is configured to receive search requests. Product or seller information acquisition module 20 is configured to retrieve screening information based at least in part on the user information included in the search request. Search results processing module 30 is configured to compare the found search results with the retrieved screening information and to exclude the search result(s) that match the screening information from being presented to the searching user. Display module 40 is configured to return and display the set of search results other than those determined to be excluded based on the screening information.

In some embodiments, product or seller information acquisition module 20 comprises a storage unit and a query unit. The storage unit may be configured to store user information and the corresponding screening information. The query unit may be configured to use user information included in a search request to query for screening information stored at the storage unit that corresponds to the user information.

In some embodiments, search results processing module 30 comprises a search unit and a matching unit. The search unit is configured to obtain search results based on the search conditions included in a search request. The matching unit is configured to compare the set of found search results with the retrieved screening information. Those search results that match either the product information and/or seller information that are included in the screening information are excluded from the set of search results that are returned and displayed for the searching user.

Figure 6:
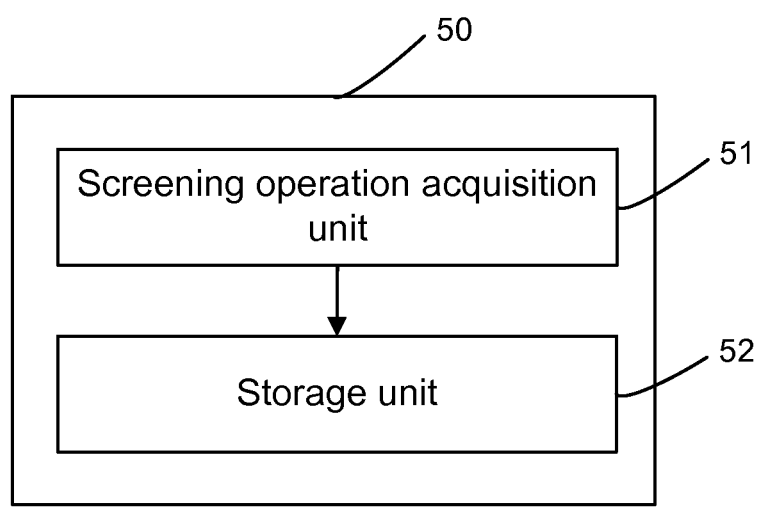
FIG. 6 is a diagram showing an example of a product or seller information determination module.

FIG. 6 is a diagram showing an example of a product or seller information determination module. In some embodiments, product or seller information determination module 50 may be added to system 500. In the example, product or seller information determination module 50 includes screening operation acquisition unit 51 and storage unit 52. Screening operation acquisition unit 51 is configured to provide one or more controls operable to indicate exclusion of one or both of product information or seller information from search results. Storage unit 52 is configured to store screening information based at least in part on a selection of the one or more controls.

Figure 7:
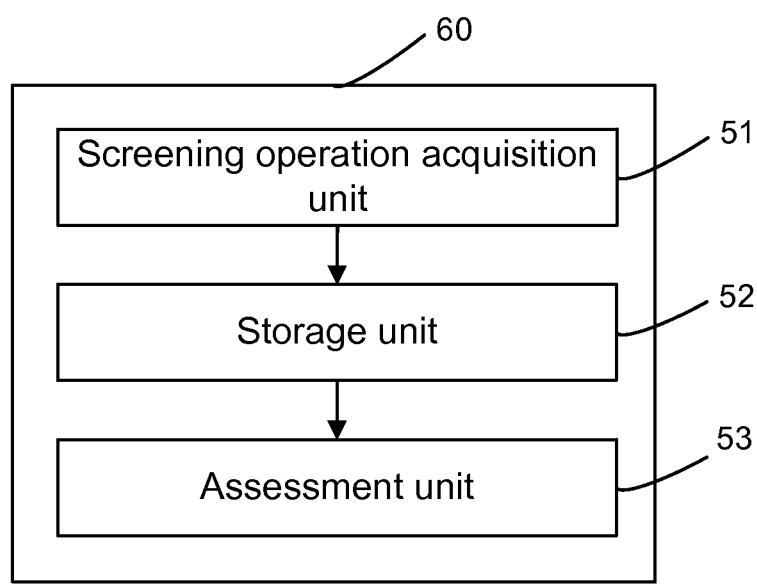
FIG. 7 is a diagram showing another example of a product or seller information determination module.

FIG. 7 is a diagram showing another example of a product or seller information determination module. In some embodiments, the product or seller information determination module 60 may be added to system 500. Product or seller information determination module 60 differs from the product or seller information determination module 50 in that the product or seller information determination module 60 further includes assessment unit 53. Assessment unit 53 is configured to determine whether stored screening information corresponding to a user's information has exceeded a threshold value. If so, then assessment unit 53 is configured to generate a prompt that alerts the user that the threshold value has been exceeded. If not, then assessment unit 53 is configured to store the new piece of screening information corresponding to the user information. In some embodiments, multiple screening information threshold values may be set such that one may be general to products of all categories and others may be associated with specific product categories. Furthermore, a first database may be configured to store the screening information that is general to all product categories; other databases may be configured to store the screening information associated with specific product categories.

By maintaining screening conditions associated with product information and/or seller information that each user desires to exclude from search results to be presented for the user, the searching experience may be enhanced for the user at the website. Using the user configured screening conditions to exclude undesirable search results from being presented to the user increases the relevancy of the presented (not excluded) search results as well as saves time for the user in perusing the presented search results.

The embodiments included in the present application are described in a progressive manner. Each embodiment emphasizes differences from other embodiments. Reference should be made to other embodiments where portions of the embodiments are identical or similar. In regard to the system embodiments, because they are fundamentally similar to the method embodiments, the descriptions are relatively simple. Reference should be made to the explanations in the process embodiments where appropriate.

The above embodiment explanations are only meant to aid in comprehension of the methods of the present application and of its core concepts. Moreover, a person with general skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for applying screening information to search results, comprising:
one or more processors configured to:
prior to receipt of a search request associated with a first user:
include in a first webpage presentations of a control and information associated with a product, and exclude in the first webpage a presentation of a search result associated with the search request, wherein the information associated with the product is provided by a second user, wherein the control is operable to indicate exclusion of the product provided by the second user from subsequently presented search results;
receive a user selection of the control, wherein the user selection is associated with a set of user information associated with the first user; and
in response to the user selection associated with the control, prior to storing a new piece of screening information, wherein the new piece of screening information includes information associated with the product provided by the second user, determine whether a set of screening information corresponding to the set of user information associated with the first user exceeds a screening information threshold value, the screening information threshold value corresponding to a total number of pieces of screening information for all product categories that are excluded from the subsequently presented search results, a total number of pieces of screening information for one or more particular product categories that are excluded from the subsequently presented search results, or both; wherein
in the event that it is determined that the screening information threshold value has been exceeded, present a prompt configured to indicate that the screening information threshold value has been exceeded; and
in the event that it is determined that the screening information threshold value has not been exceeded, store the new piece of screening information in the set of screening information corresponding to the set of user information associated with the first user;
receive the search request associated with the first user, wherein the search request comprises one or more search conditions and the set of user information associated with the first user; and subsequent to the receipt of the search request associated with the first user:
retrieve from storage the set of screening information corresponding to the set of user information associated with the first user;
determine a plurality of search results based at least in part on the one or more search conditions;
prior to presenting one or more search results to be presented to the first user from the plurality of search results, determine a search result from the plurality of search results to be excluded based at least in part on the set of screening information; and
present the one or more search results from the plurality of search results other than the search result determined to be excluded at a second webpage, wherein the first webpage is different from the second webpage; and
a memory coupled to the one or more processors and configured to provide the one or more processors with instructions.

2. The system of claim 1, wherein the search result determined to be excluded is not presented to the first user.

3. The system of claim 1, wherein the one or more search conditions comprise one or more of the following: a search keyword, a qualifier, a range, and a selection.

4. The system of claim 1, wherein the information associated with the second user comprises another set of user information.

5. The system of claim 1, wherein the search request is associated with all product categories and wherein the set of screening information is retrieved from a database configured to store screening information associated with all product categories.

6. The system of claim 1, wherein the search request is associated with a first product category and wherein the set of screening information is retrieved from a database configured to store screening information associated with the first product category.

7. The system of claim 1, wherein determining the plurality of search results based at least in part on the one or more search conditions comprises comparing the plurality of search results to the set of screening information to determine at least a search result that matches at least a portion of the set of screening information.

8. The system of claim 1, wherein the one or more processors are further configured to determine that the product is associated with a first product category, wherein the new piece of screening information corresponding to the set of user information associated with the first user is stored in a database specific to the first product category.

9. The system of claim 1, wherein in the event that it is determined that the screening information threshold value has been exceeded, inform the first user that at least one or more pieces of stored screening information must be deleted before the new piece of screening information can be stored.

10. The system of claim 1, wherein the new piece of screening information is stored in either or both a general database associated with all product categories and/or a category specific database associated with the one or more particular product categories based on whether the screening information threshold value has been exceeded.

11. A method for applying screening information to search results, comprising:
prior to receipt of a search request associated with a first user:
including in a first webpage presentations of a control and information associated with a product, and excluding in the first webpage a presentation of a search result associated with the search request, wherein the information associated with the product is provided by a second user, wherein the control is operable to indicate exclusion of the product provided by the second user from subsequently presented search results;
receiving a user selection of the control, wherein the user selection is associated with a set of user information associated with the first user; and
in response to the user selection associated with the control, prior to storing a new piece of screening information, wherein the new piece of screening information includes information associated with the product provided by the second user, determining whether a set of screening information corresponding to the set of user information associated with the first user exceeds a screening information threshold value, the screening information threshold value corresponding to a total number of pieces of screening information for all product categories that are excluded from the subsequently presented search results, a total number of pieces of screening information for one or more particular product categories that are excluded from the subsequently presented search results, or both; wherein
in the event that it is determined that the screening information threshold value has been exceeded, presenting a prompt configured to indicate that the screening information threshold value has been exceeded; and
in the event that it is determined that the screening information threshold value has not been exceeded, storing the new piece of screening information in the set of screening information corresponding to the set of user information associated with the first user;
receiving the search request associated with the first user, wherein the search request comprises one or more search conditions and the set of user information associated with the first user; and
subsequent to the receipt of the search request associated with the first user:
retrieving from storage the set of screening information corresponding to the set of user information associated with the first user;
determining a plurality of search results based at least in part on the one or more search conditions;
prior to presenting one or more search results to be presented to the first user from the plurality of search results, determining, using one or more processors, a search result from the plurality of search results to be excluded based at least in part on the set of screening information; and
presenting the one or more search results from the plurality of search results other than the search result determined to be excluded at a second webpage, wherein the first webpage is different from the second webpage.

12. The method of claim 11, wherein the search result determined to be excluded is not presented to the first user.

13. The method of claim 11, wherein the one or more search conditions comprise one or more of the following: a search keyword, a qualifier, a range, and a selection.

14. The method of claim 11, wherein the search request is associated with all product categories and wherein the set of screening information is retrieved from a database configured to store screening information associated with all product categories.

15. The method of claim 11, wherein the search request is associated with a first product category and wherein the set of screening information is retrieved from a database configured to store screening information associated with the first product category.

16. The method of claim 11, wherein determining the plurality of search results based at least in part on the one or more search conditions comprises comparing the plurality of search results to the set of screening information to determine at least the search result that matches at least a portion of a set of screening information.

17. The method of claim 11, wherein in the event that it is determined that the screening information threshold value has been exceeded, inform the first user that at least one or more pieces of stored screening information must be deleted before the new piece of screening information can be stored.

18. The method of claim 11, wherein the new piece of screening information is stored in either or both a general database associated with all product categories and/or a category specific database associated with the one or more particular product categories based on whether the screening information threshold value has been exceeded.

19. A computer program product for applying screening information to search results, the computer program product being embodied in a non-transitory computer readable storage medium and comprising computer instructions for:
  prior to receipt of a search request associated with a first user:
    including in a first webpage presentations of a control and information associated with a product, and excluding in the first webpage a presentation of a search result associated with the search request, wherein the information associated with the product is provided by a second user, wherein the control is operable to indicate exclusion of the product provided by the second user from subsequently presented search results;
    receiving a user selection of the control, wherein the user selection is associated with a set of user information associated with the first user; and
    in response to the user selection associated with the control, prior to storing a new piece of screening information, wherein the new piece of screening information includes information associated with the product provided by the second user, determining whether a set of screening information corresponding to the set of user information associated with the first user exceeds a screening information threshold value, the screening information threshold value corresponding to a total number of pieces of screening information for all product categories that are excluded from the subsequently presented search results, a total number of pieces of screening information for one or more particular product categories that are excluded from the subsequently presented search results, or both; wherein
      in the event that it is determined that the screening information threshold value has been exceeded, presenting a prompt configured to indicate that the screening information threshold value has been exceeded; and
      in the event that it is determined that the screening information threshold value has not been exceeded, storing the new piece of screening information in the set of screening information corresponding to the set of user information associated with the first user;
  receiving the search request associated with the first user, wherein the search request comprises one or more search conditions and the set of user information associated with the first user; and
  subsequent to the receipt of the search request associated with the first user:
    retrieving from storage the set of screening information corresponding to the set of user information associated with the first user;
    determining a plurality of search results based at least in part on the one or more search conditions;
    prior to presenting one or more search results to be presented to the first user from the plurality of search results, determining a search result from the plurality of search results to be excluded based at least in part on the set of screening information; and
    presenting the one or more search results from the plurality of search results other than the search result determined to be excluded at a second webpage, wherein the first webpage is different from the second webpage.

20. The computer program product of claim 19, wherein in the event that it is determined that the screening information threshold value has been exceeded, inform the first user that at least one or more pieces of stored screening information must be deleted before the new piece of screening information can be stored.

21. The computer program product of claim 19, wherein the new piece of screening information is stored in either or both a general database associated with all product categories and/or a category specific database associated with the one or more particular product categories based on whether the screening information threshold value has been exceeded.

* * * * *